May 29, 1962  E. AXSOM  3,036,710
ENTOMOLOGIST'S EGG SEPARATOR
Filed Sept. 11, 1959  4 Sheets-Sheet 1
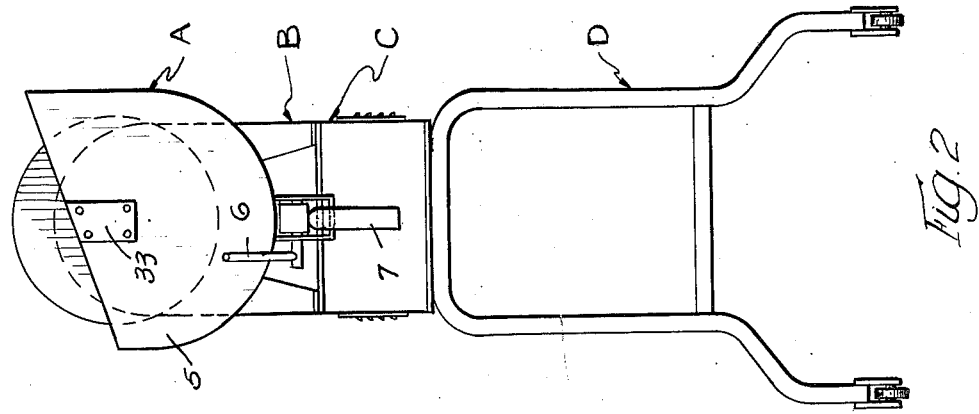
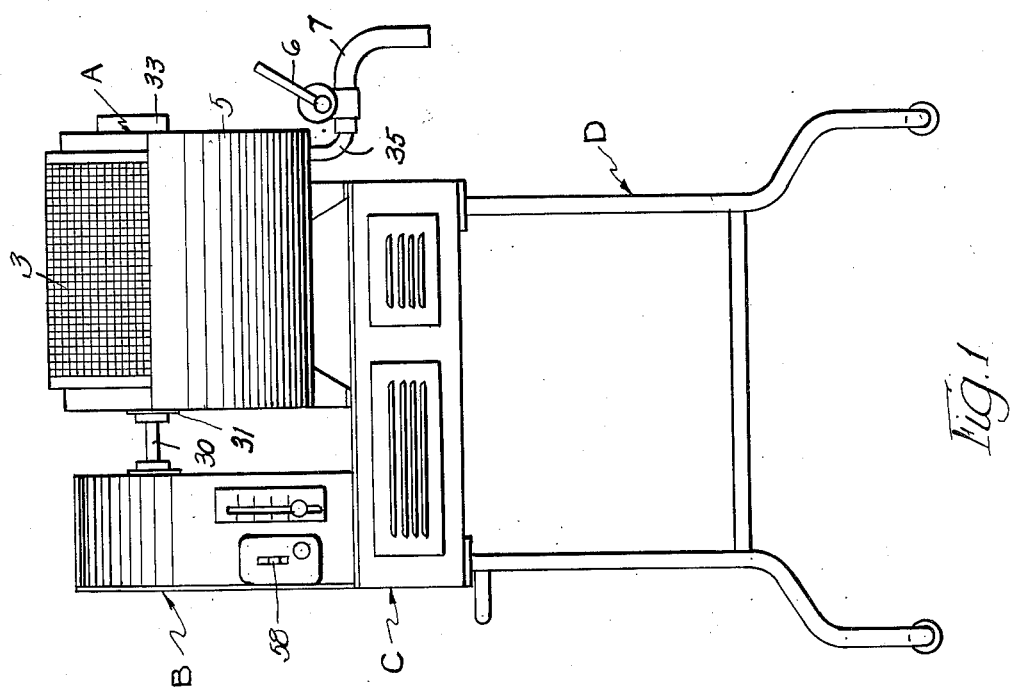
INVENTOR.
Everett Axsom,
BY Sabin C. Bronson
att'y May 29, 1962  E. AXSOM  3,036,710
ENTOMOLOGIST'S EGG SEPARATOR
Filed Sept. 11, 1959  4 Sheets-Sheet 2

INVENTOR.
Everett Axsom,
BY

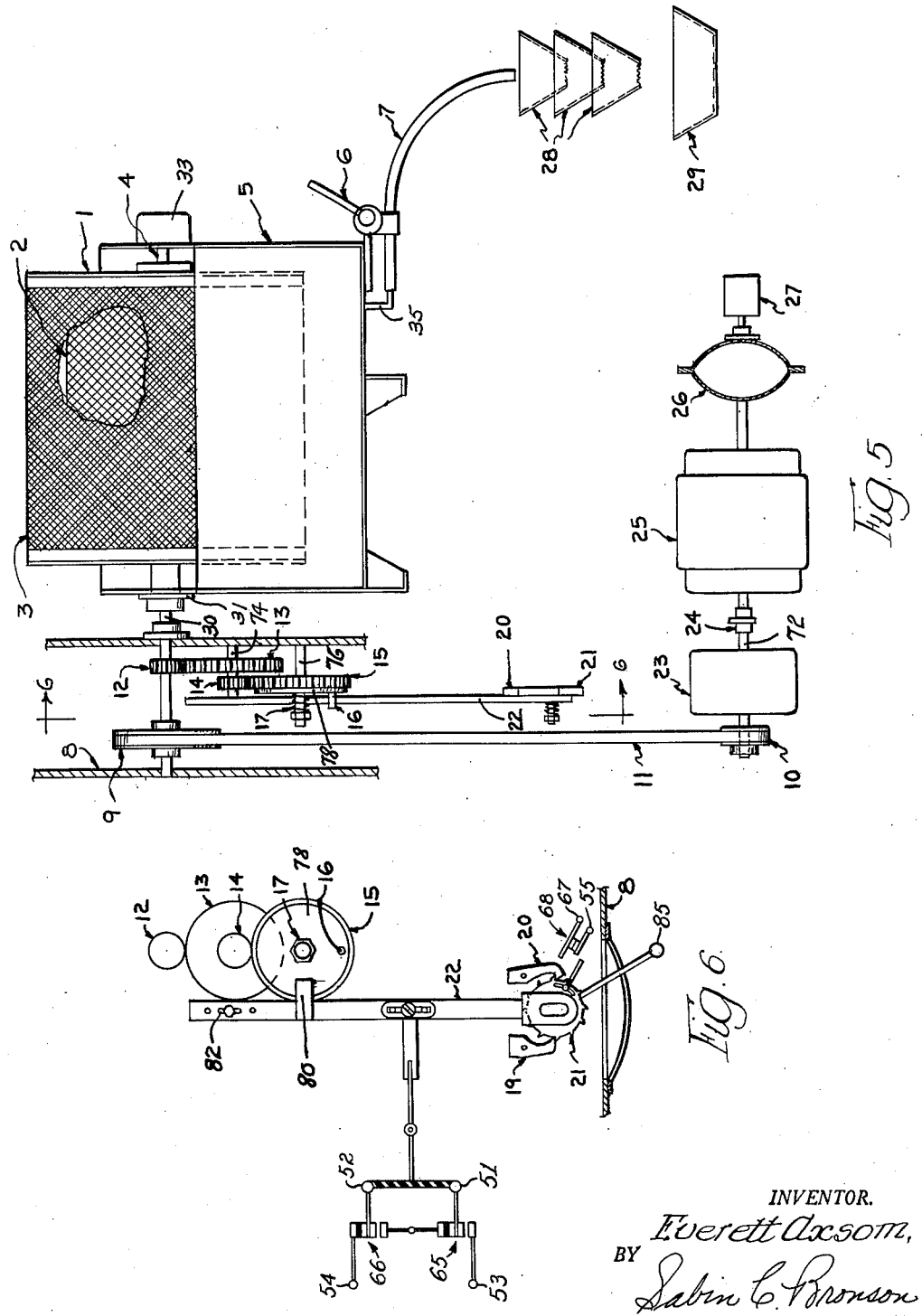

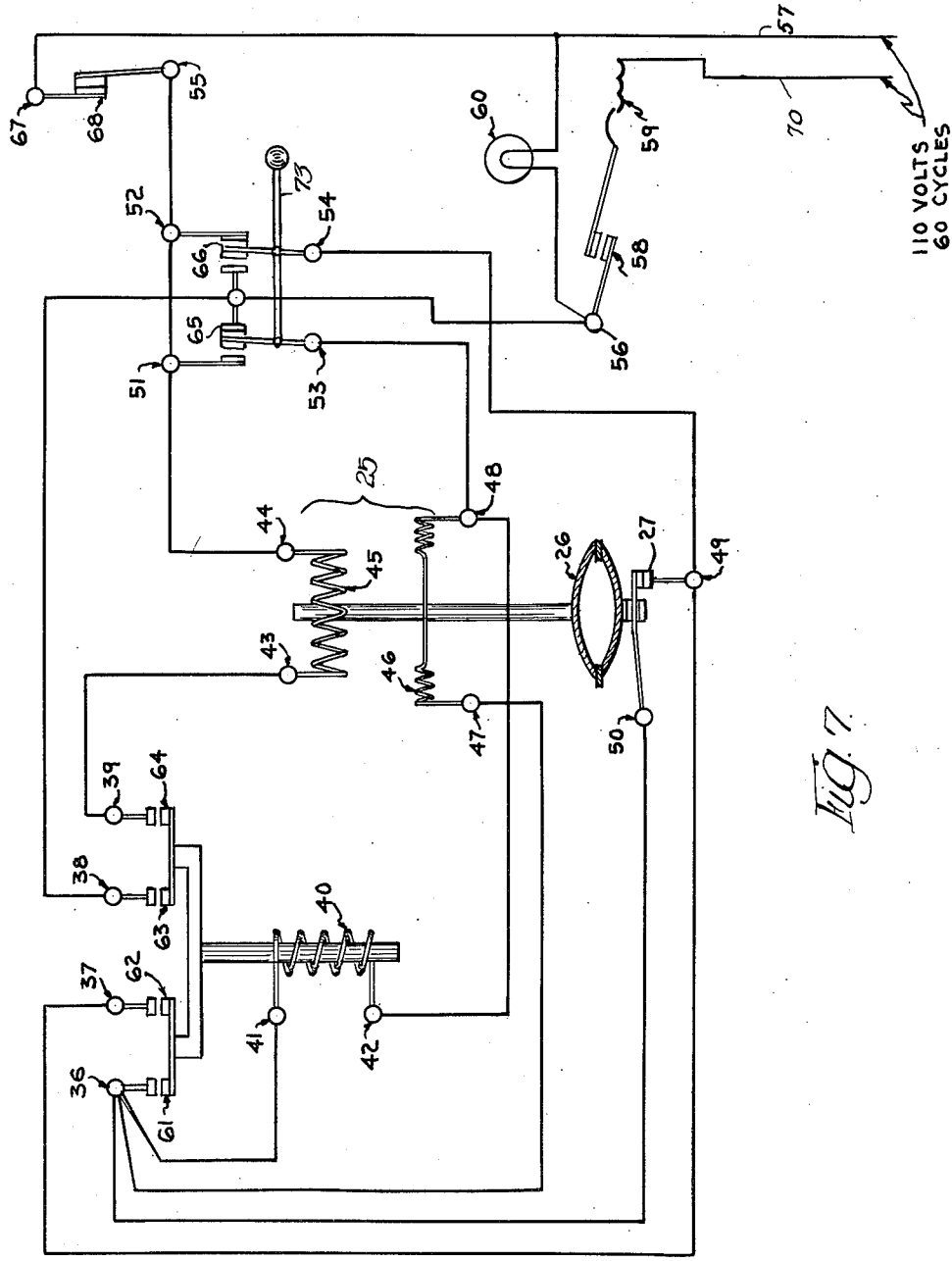

United States Patent Office 3,036,710
Patented May 29, 1962

3,036,710
ENTOMOLOGIST'S EGG SEPARATOR
Everett Axsom, R.R. 2, Box 196, Lowell, Ind.
Filed Sept. 11, 1959, Ser. No. 839,320
7 Claims. (Cl. 209—291)

This invention relates to improvements in devices for the measurement of the abundance of mosquitoes in a certain ground area. Such information is important to the epidemiologist who desires to relate the prevalance of vector species to the incidence of mosquito-borne diseases, and particularly it is important to mosquito control agencies for evaluation of their abatement programs.

Mosquito eggs have distinctive markings by which the specie may be determined. Different species of mosquitoes may be treated in different ways in the abatement programs. Thus it is important to determine the kind of species that are present in certain areas so that the area can be effectively treated by the control agencies.

Therefore it is the principal object of my present invention to determine the number of mosquito eggs and the species of mosquitoes that will hatch therefrom per unit area of certain acreage where the insects repeatedly lay their eggs.

It is another object of the invention to provide a machine which will separate the mosquito eggs from the soil of a sample from the area to be treated without damage to the eggs, so that they may be examined and analyzed and the number and species of eggs per sample may be determined.

Other objects and advantages of the invention will appear in the following description thereof.

Referring now to the accompanying drawing forming part of this application and wherein like reference characters indicate like parts.

FIG. 1 is a side elevational view of the unit for treating a soil sample and separating the mosquito eggs therefrom.

FIG. 2 is an end view of FIG. 1.

FIG. 5 is a view showing the mechanical parts of the unit, and diagrammatically, the drive mechanism therefor.

FIG. 6 is a section on line 6—6 of FIG. 5, showing the control mechanism of the unit, diagrammatically.

FIG. 7 is a wiring diagram of the electrical system for the unit which operates on 110 volts 60 cycle circuit.

Figure 3:
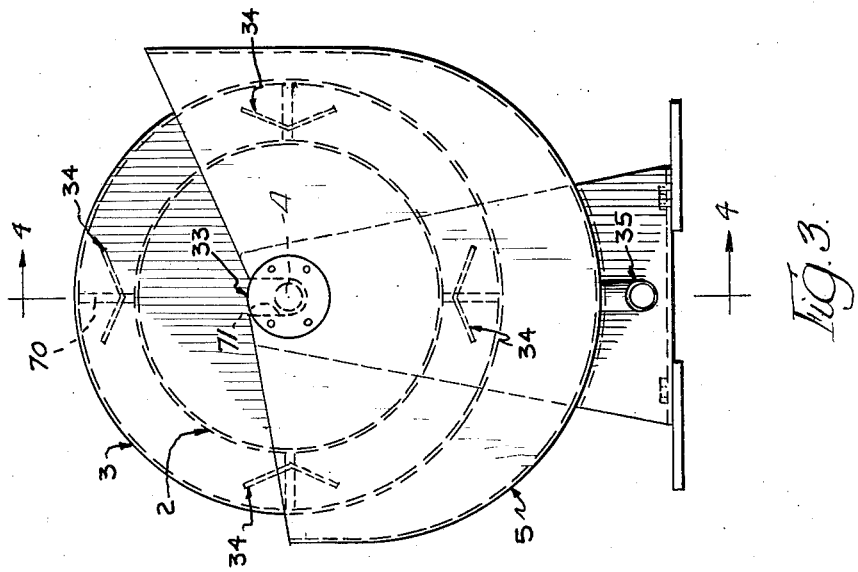
FIG. 3 is an end view of the tank and drum of FIG. 1, somewhat enlarged.
Figure 4:
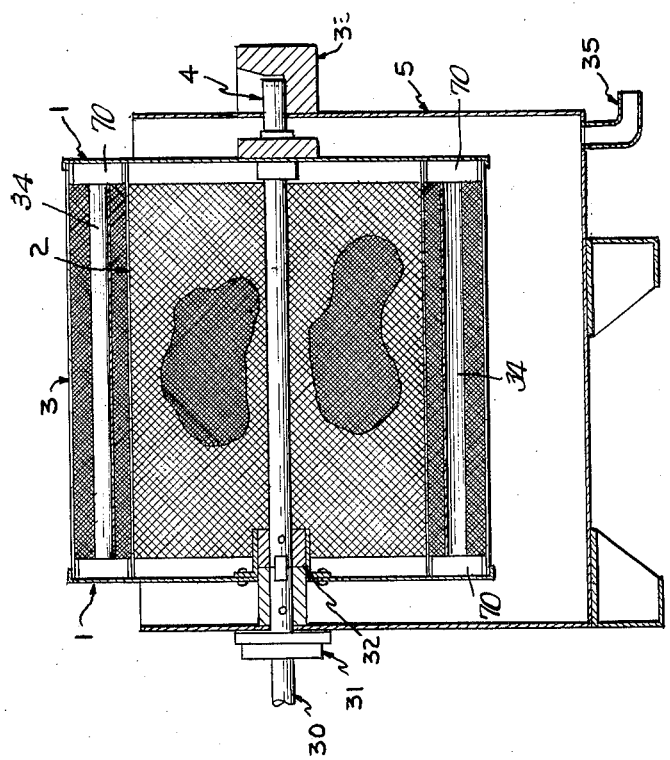
FIG. 4 is a section taken on line 4—4 of FIG. 3.

Referring to the drawings in detail, unit A indicates the revolving drum and tank; unit B is the control mechanism; unit C is the motor compartment; and D indicates a stand for the support of the device.

1 indicates a rotative drum having spaced circular heads, between which extend horizontally disposed spacing strap elements 70, the heads being mounted for rotation with the horizontally disposed axial shaft 4. 2 is a cylindrical, inner screen of about #4 mesh, also mounted concentrically on shaft 4 for rotation therewith. This screen extends between the heads or ends of the drum and is secured thereto. Concentrically mounted around the screen 2 is a cylindrical screen 3 of approximately #16 mesh. The ends of this screen 3 are secured to the heads or ends 1. Thus two concentric rotatable screens of different mesh are mounted for rotation upon the shaft 4. This screen assembly is mounted within a container or tank 5, which is semi-cylindrical in form and provided with a bearing block 33, having an upwardly open U-shaped seat 71 therein, in which rests the projecting end of shaft 4 for rotation therein. Shaft 4 projects outwardly through the other side of the container 5 into bearing 31, similar to bearing 33 and whereby the entire screen assembly may be lifted vertically for cleaning or other purposes. The other end of drum shaft 4, and the abutting end of the drive shaft 30 are cooperatively formed into what amounts to a jaw clutch 32 and acts as a drive from shaft 30 to drum shaft 4. A suitable drainage elbow 35 is secured to a lower corner of the tank which leads to a valve 6. By opening valve 6 the tank may be drained of such material as passes through the two screens. Tube 7 is connected to valve 6 at one end and conducts material, including the mosquito eggs, therethrough and discharges same into the upper one of a plurality of vertically spaced, conical progressively finer mesh screens 28 and 29. The screens 28 are of 30, 40 and 100 mesh, and the screen 29 is also of about 100 mesh, too fine for the eggs to pass therethrough and thus they are there collected for examination and classification.

It should be noted in connection with the drum and tank unit A that a plurality of horizontally extending V-shaped vanes 34 are positioned between the two screen cylinders 2 and 3 and spaced 90° apart at diametrically opposite locations. Thus when the screens are rotated on their axes, the leading half of the vane as it rotates draws water into the screens, whereas the following half of the vanes force water out on the other side. This assures that there is sufficient turbulence within the tank to separate and wash the eggs from the sample.

The drive for the unit is as follows:

Shaft 30 extends within the control unit B, being journaled within the spaced walls 8 of said control unit. On shaft 30 is fixed a belt pulley 9 which is turned by belt 11 from pulley 10 on armature shaft 72 from gear reducer 23. A single phase induction motor 25 is positioned in line with gear reducer 23 and is coupled thereto by coupling 24. The speed of motor 25, effect of reducer 23, and relation of pulleys 9 and 10 are such that the motor 25 rotates pulley 9 at a speed of one revolution per second, which in turn rotates shaft 30 and thus the screen cylinders at the same rate. On shaft 30 is also mounted the pinion gear 12 which meshes with gear 13 mounted on stub shaft 74. On shaft 74 is also mounted a spur gear 14 which meshes with gear 15 mounted on stub shaft 76. Also mounted on shaft 76 is a friction disc clutch 78 which is spring loaded against the face of gear 15 by spring 17. The gear train is set so that when pulley 9 makes twenty-five revolutions, gear 15 makes one revolution. A peg 16 projects normally from the face of the clutch 78 and rotates therewith when clutch disc is engaged with gear 15. A reciprocable bar 22 is slidably mounted as at 82, and extends parallel to and adjacent the gear 15. An extension 80 on bar 22 projects in a plane parallel to and adjacent the face of the disc 78 in the path of the pin 16 as it rotates with the disc. When a cycle of twenty-five revolutions of pulley 9 has been reached and thus gear 15 and clutch 78 have made one revolution, the peg 16 on the clutch will engage the extension 80 on bar 22. Bar 22 is then forced to move one way or another, depending on the direction of rotation of clutch 78. This movement of the bar 22 shifts the switches 65 and 66 so that they will close to the other side, thus reversing the direction of current flow through the motor coils and reversing the direction of rotation of the motor and the screen drums. Spring loaded balls (not shown) hold the bar in its shifted position. When the bar 22 has shifted, the pawls 19 or 20 cause the ratchet wheel 21 to move one notch, which moves the control knob 85 one notch counterclockwise.

Ratchet wheel 21 is in turn connected so as to open the micro-switch 68 when five cycles have been completed, whereby the unit automatically turns itself off.

The electrical system for the device is shown in FIG. 7. It operates on 110 volt 60 cycle circuit.

40 indicates a relay which is the primary actuator for the system. Moved by the relay are the pairs of contact points 61, 62, 63, and 64. Terminal 36 of contact 61 is connected to terminal 50 of micro-switch 27; to the terminal 47 of the directional coils 46 of motor 25; and to the terminal 41 of relay coil 40. Terminal 37 of contact 62 is connected to terminal 49 of micro-switch 27, and also to terminal 54 of micro-switch 66. Terminal 38 of contact 63 is connected to the center contact of micro-switches 65 and 66. Terminal 39 of contact 64 is connected to terminal 43 of the coils 45 of motor 25. Terminal 42 of relay 40 is connected to terminal 48 of the directional motor coils 46 of motor 25. Terminal 44 of motor coils 45 is connected to terminal 51 of micro-switch 65, and also to terminal 52 of micro-switch 66. Terminal 52 is connected to terminal 55 of micro-switch 68 and terminal 67 of this latter switch is connected to one side 57 of the power line supply. Terminal 53 of micro-switch 65 is connected to terminal 48 of the directional coils 46 of motor 25. Terminal 54 of micro-switch 66 is connected to terminal 49 of micro-switch 27. Terminal 56 of the off and on switch 58 is connected to the center contact of micro-switches 65 and 66. The other side 70 of the power line is connected through a thermal switch 59 to the off and on switch 58. A light 60 is connected in parallel across the power line above switch 58 to indicate when power is on to the unit.

The micro-switch 68 is actuated by the pawl and ratchet mechanism of FIG. 6 when an accumulation of five alternate cycles of twenty-five revolutions each have been attained. This micro-switch is normally closed, and only opens when the said number of cycles has been reached.

Switches 65 and 66 are normally closed one way or the other, and will be shifted by the bar 22 shown in FIGS. 5 and 6. A lever 73 is connected to both armature arms of switches 65 and 66 so as to be able to manually set the contacts in cases where the contacts have been forced into a neutral position.

To start the unit the control knob 85 is moved to its clockwise limit, and the switch 58 is manually closed. Since switch 68 is normally closed as are also switches 65 and 66, and switch 27 current will flow from power line 70, through switch 65, through relay coils 40, through switch 27, through switches 66 and 68 to the other power line 57. This actuates the relay 40 and closes contacts 61, 62, 63, and 64. Current then flows through relay 40 to the motor coils 45 and the directional coils 46 of motor 25 causing the same to start, which causes the centrifugal device 26 to open switch 27. The direction in which the motor rotates is determined by the direction in which the current flows through the directional coils. It should be remembered that motor 25 is a single phase induction motor with the windings thereof connected as shown which causes the same to start, stop and reverse by the mechanism described. The motor will then operate until a cycle of twenty-five revolutions of the drum has been accumulated, when the micro-switches 65 and 66 will be shifted to close to the left by the action of pin 16 contacting extension 80 of bar 22. The shifting of the switches from one closing position to the other is not instantaneous, there being a slight delay in movement of the armature from right to left, which delay allows the relay to open, and the motor to slow down until the micro-switch 27 closes. This disconnects power to one side of the directional coils of the motor, the motor coasts, and the centrifugal governor device 26 closes the switch 27 assuring that the motor comes to a full stop before starting again in the opposite direction.

When the micro-switches 65 and 66 do close to the left, and the switch 27 closes, the circuitry then is the same as above described, except that the current flows through the directional motor coils in the opposite direction, which causes the motor to operate in the reverse direction.

The operation of the device is as follows:

A soil sample is placed inside the inner screen drum 2 with tank 5 about two-thirds full of water. The soil sample in size is about 6 inches by 6 inches square, 1 inch thick, and for best results the sampling should be uniform in area and thickness. Switch 58 is then closed which starts the motor 25 and through the gear chain previously described rotates the drum about its shaft at a speed of one revolution per second. At the conclusion of twenty-five revolutions, by the reversing mechanism described, the motor stops, the current flow thereto is reversed in direction, and the motor then starts in the reverse direction for another 25 revolutions. This goes on until the end of five of these cycles, or 125 revolutions in all, when the switch 68 opens, stopping the unit automatically. This assures uniform treatment of each sample.

After the cylinder has rotated the required number of revolutions, the matter which has passed through the screens 2 and 3 into the water in tank 5 is drained with the water by opening valve 6. The material then flows through hose 7 into the upper end of three cone shaped screens of 30, 40, and 100 mesh. At this stage, the screen assembly comprising screen drums 1 and 2 may be removed and washed, and another sample placed therein. The conical screens are then sprayed carefully successively so as not to wash out any material that may contain mosquito eggs, this being done from the top coarser mesh screen to the bottom fine mesh screen. The bottom 100 mesh screen will now contain the eggs and some silt. To separate the silt from the eggs, it is washed with a squeeze bottle into a small screen cup of 100 or finer mesh for transfer to a beaker or percolator. The percolator is about two-thirds filled with a salt water brine which is agitated for a few moments by air blown through a tube extended to the bottom of the beaker. This gives good separation to the eggs, and then the beaker is allowed to settle, the eggs floating on top and the remaining sediment settling to the bottom. The eggs are then skimmed off and transferred to a small porcelain cup, from whence they may be placed under a microscope for examination and classification.

I claim:

1. A device for separating minute particles from a sample of material, comprising a container, cylindrical screen drums one within another rotatable on a common shaft within said container, the innermost screen being of coarser mesh than the outermost screen, means for rotating said screen drums alternately in opposite directions a like number of revolutions in each direction, said means comprising a single phase electric induction motor, and means causing said motor to reverse in direction at the conclusion of a predetermined number of revolutions, said last mentioned means including means driven by the motor and switch means actuated thereby to stop the motor at the conclusion of a cycle of revolutions in one direction.

2. A device for separating minute particles from a sample of material, comprising a container partially filled with water, screen drums one within another rotatable on a common axial shaft within said container, said screen drums being partially submerged in said water, the inner screen, receiving the sample, and being of coarser mesh than the outer screen, means for rotating said drums a predetermined number of revolutions in one direction, means for rotating said drums a predetermined number of revolutions in the reverse direction, means driven by the motor and switch means actuated thereby to stop the drums at the conclusion of each cycle of revolutions, and means for draining said tank into a plurality of successively finer mesh screen cups, the desired particles being collected in the last cup.

3. A device for separating minute particles from an aggregate sample of material, comprising a stationary container, a rotatable shaft mounted within said container, cylindrical screen drums one within another mounted on said shaft for rotation therewith, a gear train connected with said shaft, a single phase induction motor connected to said gear train to operate the same and thereby said screen drums, means for reversing the motor at the conclusion of a predetermined number of revolutions of said drums in one direction, and means actuating said motor reversing means, said last mentioned means including means driven by the motor, and switch means actuated thereby and effective at the conclusion of a predetermined number of revolutions of said screen drums, for stopping the motor.

4. A device for separating minute particles from a sample of material, comprising a container, cylindrical screen drums one within another rotatable on a common shaft within said container, the innermost screen being of coarser mesh than the outermost screen, a gear train connected with said shaft, means for rotating said screen drums a predetermined number of revolutions in one direction, means for rotating said screen drums a predetermined number of revolutions in the opposite direction, said means comprising a single phase electric induction motor, and means actuated by said gear train to stop the motor, and means causing said motor to reverse in direction at the conclusion of each predetermined number of revolutions.

5. A device for separating minute particles from a sample of material, comprising rotatable screen means, a single phase induction motor for rotating said rotatable screen means, a power source for said motor, relay means for reversing the direction of current from said power source through said motor to reverse said motor and rotate the screens in the opposite direction, a gear train between the motor and screen means actuated by the motor, and means actuated by said gear train for actuating the relay means at the conclusion of a cycle of revolutions and thereby reversing the motor, said last mentioned means also including actuating means to stop the motor at the conclusion of a predetermined number of cycles of revolutions.

6. A device for separating minute particles from a sample of material comprising a container, cylindrical screen drums one within another rotatable on a common shaft within said container, said shaft being mounted for vertical removal whereby said drums may be removed for cleaning after processing each sample, a motor for rotating said screen means a cycle of revolutions in one direction, means operable at the end of each cycle of revolutions for stopping the motor, means reversing the motor for rotating the screens a cycle of revolutions in the opposite direction, and means for stopping the device at the conclusion of a predetermined number of cycles of revolutions, said last mentioned means including a lever moved at the conclusion of each cycle of revolutions, and a switch operable by said lever at the conclusion of said predetermined number of cycles of revolutions to stop the device.

7. The structure set forth in claim 1, said container containing a quantity of water, and vanes interposed between a pair of the screen drums and rotatable therewith for drawing water from the container into the screens and causing turbulence within the container.

References Cited in the file of this patent

UNITED STATES PATENTS

| | | |
|---|---|---|
| 616,033 | Sturcke | Dec. 13, 1898 |
| 1,123,166 | Burton | Dec. 29, 1914 |
| 1,151,990 | Balzer | Aug. 31, 1915 |
| 2,237,373 | Sinclair | Apr. 8, 1941 |
| 2,806,597 | Gregersen | Sept. 17, 1957 |